United States Patent
Sugawara et al.

(10) Patent No.: US 7,571,702 B2
(45) Date of Patent: Aug. 11, 2009

(54) RESIN COMPOSITION FOR INTAKE SYSTEM PART FOR INTERNAL COMBUSTION ENGINE AND INTAKE SYSTEM PART

(75) Inventors: Sueki Sugawara, Sodegaura (JP); Toshiyuki Ishii, Sodegaura (JP); Kazuyuki Iida, Sodegaura (JP); Taketoshi Matsumoto, Hamamatsu (JP); Kunimoto Sugiyama, Hamamatsu (JP); Makoto Nakamichi, Hamamatsu (JP)

(73) Assignee: Toyo Roki Mfg. Co., Ltd., Hamamatsu-shi (JP)

( * ) Notice: Subject to any disclaimer, the term of this patent is extended or adjusted under 35 U.S.C. 154(b) by 107 days.

(21) Appl. No.: 11/667,163

(22) PCT Filed: Oct. 6, 2006

(86) PCT No.: PCT/JP2006/020093

§ 371 (c)(1),
(2), (4) Date: May 7, 2007

(87) PCT Pub. No.: WO2007/043468

PCT Pub. Date: Apr. 19, 2007

(65) Prior Publication Data

US 2008/0110429 A1 May 15, 2008

(30) Foreign Application Priority Data

Oct. 7, 2005 (JP) .............................. 2005-294979

(51) Int. Cl.
*F02M 35/10* (2006.01)

(52) U.S. Cl. .................................. 123/184.61; 524/528
(58) Field of Classification Search ............ 123/184.61; 524/528
See application file for complete search history.

(56) References Cited

U.S. PATENT DOCUMENTS 4,469,138 A * 9/1984 Satoh .......................... 524/522

FOREIGN PATENT DOCUMENTS

| JP | 1 319549 | 12/1989 |
|----|----------|---------|
| JP | 2 58552 | 2/1990 |
| JP | 6 178385 | 6/1994 |
| JP | 9 29026 | 2/1997 |
| JP | 2003277525 A * | 10/2003 |
| JP | 2004 155942 | 6/2004 |
| JP | 2005 23164 | 1/2005 |

* cited by examiner

*Primary Examiner*—Noah Kamen
(74) *Attorney, Agent, or Firm*—Oblon, Spivak, McClelland, Maier & Neustadt, P.C.

(57) ABSTRACT

A resin composition for a component of an air intake system of an internal combustion engine including the following components (1), (2), and (3):
[Components]
(1) polypropylene-based resin: 67 to 89 wt %
(2) acid-modified polypropylene-based resin: 1 to 3 wt %
(3) carbon fiber and graphite powder: 10 to 30 wt %,
the relationship between the thickness and the resonance frequency of a test specimen formed of the resin composition satisfying the following expression:

[Relationship between thickness and resonance frequency] resonance frequency (Hz) $\geq (98.5 \times \text{thickness (mm)}) + 15$.

8 Claims, 1 Drawing Sheet

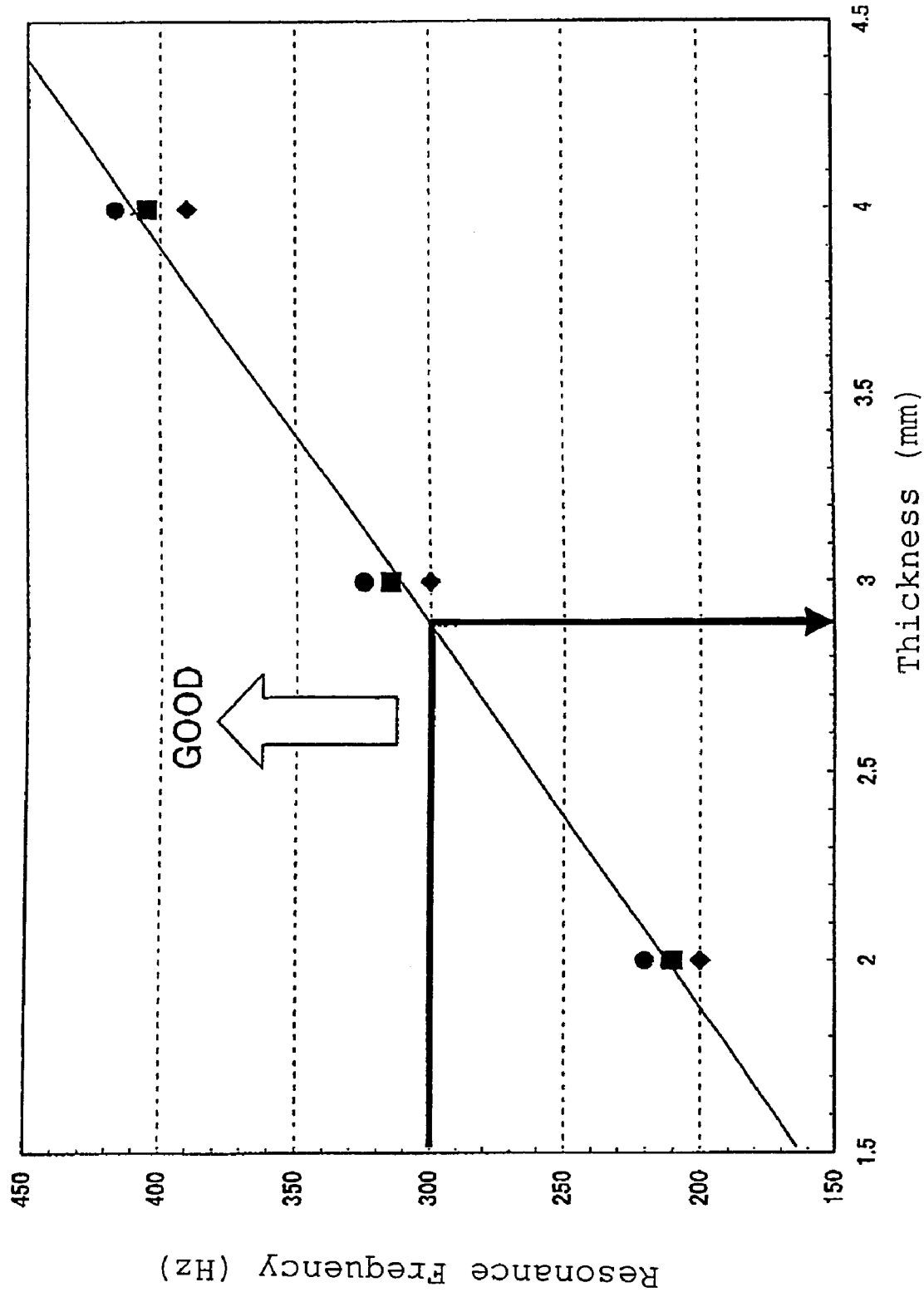

RESIN COMPOSITION FOR INTAKE SYSTEM PART FOR INTERNAL COMBUSTION ENGINE AND INTAKE SYSTEM PART

TECHNICAL FIELD

The invention relates to a resin composition for a component of an air intake system of an internal combustion engine and a component of an air intake system comprising the resin composition.

BACKGROUND ART

Polypropylene-based resins excellent in recycling properties are used in components of the air intake system of the conventional internal combustion engine. To reinforce the strength or rigidity of the components of the air intake system of an internal combustion engine at high temperatures or to minimize leakage of noises generated inside the air intake system at the time of air intake, specifically to improve inertance (inertance is indicative of difficulty of transmission of wave motion inside a component), an inorganic filler such as talc is added to the polypropylene-based resin. By increasing the amount of the inorganic filler, the above-mentioned properties can be improved (see Patent Document 1, for example)

When a significantly large amount of filler is used, problems such as lowered flow processability at the time of molding and insufficient filling arise.

Recent technologies require automobiles to be manufactured using materials which are light in weight. Therefore, an increased amount of filler cannot be used in components of the air intake system, since the weight of the components eventually increases due to the high specific gravity of the filler.

From the viewpoint of thermal recycling (recovery of energy generated by combustion), a need has been felt for a technology for reducing the amount of combustion residues. Taking this point into consideration, the amount of inorganic filler cannot be increased.

Use of glass fiber having a larger aspect ratio than that of ordinarily used talc provides a better rigidity improving effect for a smaller amount of inclusion. However, use of such a fibrous filler causes warping deformation of the component during molding. Therefore, use of a small amount of mica, which is a sheet-like filler, has been proposed to suppress the occurrence of warping deformation and to obtain rigidity equivalent to or larger than that obtained using glass fibers.

To decrease the amount of combustion residues, graphite powder or carbon fiber is used as the filler. Graphite is used alone as the filler (Patent Document 2, for example). Components obtained using graphite alone exhibit insufficient strength. If a carbon fiber is used alone as the filler, the resultant components undergo warping deformation during molding. Therefore, a proper amount of an inorganic component such as mica is mixed in.

Although teachings are found regarding specific. improvement of internal loss by use of a carbon filler (Patent Document 3, for example), the relationship between the apparent density of graphite and resonance frequency has not been elucidated.

Patent Document 1: JP-A-2005-023164
Patent Document 2: JP-A-01-319549
Patent Document 3: JP-A-02-058552

As explained above, there has been a desire for a resin which is based on polypropylene excellent in recycling properties, can suppress occurrence of warping deformation without increasing the amount of combustion residues while maintaining a high degree of strength and rigidity, and can improve acoustic properties as compared with inorganic filler-containing resins.

An object of the invention is to provide a resin composition for a component of an air intake system of an internal combustion engine which can improve acoustic properties while maintaining high strength and low specific gravity and generates a reduced amount of combustion residues, as well as a component of an air intake system using the resin composition.

DISCLOSURE OF THE INVENTION

As a result of extensive studies, the inventors found that the above object can be attained when a specific relationship is satisfied between the thickness and the resonance frequency of a test specimen formed of a resin composition containing carbon fibers and graphite powder. The inventors also paid attention to the form of the graphite powder, and found that the above object can be attained by optimizing the particle diameter and the apparent density (thinness) of the graphite powder. The invention has been made based on these novel findings.

The invention provides the following resin composition for a component of an air intake system of an internal combustion engine, or the like.

1. A resin composition for a component of an air intake system of an internal combustion engine comprising the following (1), (2), and (3):

[Components]
   (1) polypropylene-based resin: 67 to 89 wt %
   (2) acid-modified polypropylene-based resin: 1 to 3 wt %
   (3) carbon fiber and graphite powder: 10 to 30 wt %,
   the relationship between the thickness and the resonance frequency of a test specimen formed of the resin composition satisfying the following expression:

[Relationship between thickness and resonance frequency]resonance frequency (Hz)≧(98.5×thickness (mm))+15.

2. A resin composition for a component of an air intake system of an internal combustion engine which comprises the following components (i), (ii), and (iii):

[Components]
   (i) polypropylene-based resin with a melt flow rate (at a temperature of 230° C. and under a load of 2.16 kg) of 5 to 70 g/10 min: 67 to 89 wt %
   (ii) acid-modified polypropylene-based resin: 1 to 3 wt %
   (iii) carbon fiber with a fiber diameter (D1) of 5 μm<D1<10 μm and graphite powder with an average particle diameter (D2) of 5 μm≦D2≦15 μm and an apparent density (ρ) of 0.02 g/cm³≦ρ≦0.1 g/cm³: 10 to 30 wt %.

3. A resin composition for a component of an air intake system of an internal combustion engine according to 1 or 2, wherein the component of the air intake system is an air duct constituting an air intake channel of the internal combustion engine; a resonator or a side branch provided in the air intake channel of the internal combustion engine to reduce air intake noise; or an air cleaner for removing dust in the air intake channel of the internal combustion engine.

4. A resin composition for a component of an air intake system of an internal combustion engine according to any one of 1 to 3, wherein the resin composition has a flexural strength of 80 MPa or more and a flexural modulus of 3,800 MPa or more, as measured according to JIS K-7171, and wherein the amount of combustion residues derived from the carbon fiber and the graphite powder is 3% or less, as measured by a combustion residue measurement test.

5. A component of an air intake system of an internal combustion comprising the resin composition according to any one of 1 to 4.

The invention provides a resin composition for a component of an air intake system of an internal combustion engine, and a component of air intake system which can decrease the amount of combustion residues while maintaining high strength and low specific gravity, and can improve acoustic properties.

BRIEF DESCRIPTION OF THE DRAWING

The FIGURE is a graph showing a relationship between thickness and resonance frequency.

BEST MODE FOR CARRYING OUT THE INVENTION

The resin composition for a component of an air intake system of an internal combustion system of the invention contains the following components (1), (2), and (3).
(1) polypropylene-based resin: 67 to 89 wt %
(2) acid-modified polypropylene-based resin: 1 to 3 wt %
(3) carbon fiber and graphite powder: 10 to 30 wt %

The relationship between the thickness and the resonance frequency of a test specimen formed of the resin composition of the invention satisfies the following expression:

resonance frequency (Hz)≧(98.5×thickness (mm))+15

More preferably, the relationship satisfies the following expression:

resonance frequency (Hz)≧(98.5×thickness (mm))+25

A higher resonance frequency is preferable. Normally, the resonance frequency varies with the thickness. The larger the thickness, the higher is the resonance frequency. The resin composition satisfying the relationship represented by the above expression exhibits a high resonance frequency at a relatively small thickness. Therefore, a product obtained using the resin composition can have a reduced thickness, contributing to a reduction in weight of the product.

The resin composition for a component of an air intake system of an internal combustion system of the invention contains the following components (i), (ii), and (iii).
(i) polypropylene-based resin with a melt flow rate (at a temperature of 230° C. and under a load of 2.16 kg) of 5 to 70 g/10 min: 67 to 89 wt %
(ii) acid-modified polypropylene-based resin: 1 to 3 wt %, and
(iii) carbon fiber with a fiber diameter (D1) of 5 μm<D1<10 μm and graphite powder with an average particle diameter (D2) of 5 μm≦D2≦15 μm and an apparent density (ρ) of 0.02 g/cm$^3$≦ρ0.1 g/cm$^3$: 10 to 30 wt %.

The individual components of the composition of the invention will be described below.

1. Propylene-based Resin

In the composition of the invention, the polypropylene-based resin is a matrix resin. The polypropylene-based resin may be a homopolymer, a block copolymer, or a mixture thereof. Specific examples include a propylene homopolymer and an ethylene-propylene block copolymer.

The polypropylene-based resin used in the composition of the invention has a melt flow rate (MFR) (at a temperature of 230° C., under a load of 2.16 kg, as measured according to JIS K7210) of preferably 5 to 70 g/10 min, more preferably 10 to 70 g/10 min, and particularly preferably 20 to 60 g/10 min. If the MFR is less than 5 g/10 min, molding may be difficult. An MFR exceeding 70 g/10 min may result in lowered impact strength.

Commercially available polypropylene-based resins may be used. Specific examples include J-2003GP (manufactured by Idemitsu Petrochemical Co., Ltd., MFR=20 g/10 min), J-3000GP (manufactured by Idemitsu Petrochemical Co., Ltd., MFR=30 g/10 min), and Y-6005GM (manufactured by Idemitsu Petrochemical Co., Ltd., MFR=60 g/10 min).

The amount of the polypropylene-based resin in the composition of the invention is 67 to 89 wt %, preferably 77 to 89 wt %. If the amount of the polypropylene-based resin is less than 67 wt %, moldability deteriorates. An amount of the polypropylene-based resin exceeding 89 wt % results in insufficient rigidity and thermal resistance.

2. Acid-modified Polypropylene-based Resin

By adding an acid-modified polypropylene-based resin to the composition of the invention, the interfacial strength between the polypropylene-based resin and the carbon fiber can be increased.

The polypropylene-based resins usable in the acid-modified polypropylene-based resin are the same as those described above. Preferable examples of the acid group of the acid-modified polypropylene-based resin include carboxylic acid groups such as maleic acid group, fumaric acid group, and acrylic acid group. Of these, maleic acid group is preferable. The amount of the acid added is normally around 0.1 to 10 wt %.

The acid-modified polypropylene-based resin may be a commercial product. Specific examples of the commercially available acid-modified polypropylene-based resin include Polybond 3200, Polybond 3150 (manufactured by Shiraishi Calcium Kaisha Ltd., maleic acid-modified polypropylene), Umex 1001, Umex 1010, Umex 1003, Umex 1008 (Sanyo Chemicals Industries, Ltd., maleic acid-modified polypropylene), Admer QE800, Admer QE810 (manufactured by Mitsui Chemicals, Inc., maleic acid-modified polypropylene), and Toyotack H-1000P (manufactured by Toyo Kasei Kogyo Co., Ltd.)

The amount of the acid-modified polypropylene-based resin in the composition of the invention is 1 to 3 wt %. If the amount of the acid-modified polypropylene-based resin is less than 1 wt %, flexural strength and thermal resistance (thermal deformation temperature) decrease. An amount of the acid-modified polypropylene-based resin exceeding 3 wt % results in increased production cost, and therefore, is not practical.

3. Carbon Fiber

The carbon fiber is a component which imparts the composition of the invention with a high degree of rigidity and serves as the so-called "reinforcing component" for a molded article produced from the composition. At the same time, the carbon fiber is a component required to improve acoustic properties by decreasing the density and the ash content of the composition.

There are no restrictions on the type of the carbon fiber used in the composition of the invention. Though any of PAN (HT, IM, and HM), pitch (GP, HM), and rayon-type carbon fiber may be used, the PAN-type carbon fiber is preferable.

It is preferred that the carbon fiber used in the composition of the invention have a fiber diameter (D1) of 5 μm<D1<10

μm. If the fiber diameter is 5 μm or less, the fiber tends to break, resulting in lowered strength. In addition, a carbon fiber with such a small diameter may result in increased production cost, and therefore, may be of no practical use. A carbon fiber having a diameter of 10 μm or more has a small aspect ratio. A carbon fiber with such a small aspect ratio may also be of no practical use since it requires increased production cost.

The diameter of the carbon fiber can be measured using an electron microscope.

As the method for producing carbon fiber having a diameter in the above-described range, methods described in JP-A-2004-11030, JP-A-2001-214334, JP-A-5-261792, "New Introduction to Carbon Materials (edited by the Carbon Society of Japan, issued by Realize Advanced Technology, Ltd., 1996)", and the like can be used.

There are no restrictions on the carbon fiber insofar as the carbon fiber has a diameter in the range specified above. Commercially available carbon fiber may be used. Specific examples include Besfite (registered trademark) chopped fiber such as HTA-C6-S, HTA-C6-SR, HTA-C6-SRS, HTA-C6-N, HTA-C6-NR, HTA-C6-NRS, HTA-C6-US, HTA-C6-UEL1, HTA-C6-UH, HTA-C6-OW, HTA-C6-E, and MC HTA-C6-US; Besfite (registered trademark) filaments such as HTA-W05K, HTA-W1K, HTA-3K, HTA-6K, HTA-12K, HTA-24K, UT500-6K, UT500-12K, UT-500-24K, UT800-24K, IM400-3K, IM400-6K, IM400-12K, IM600-6K, IM600-12K, IM600-24K, LM16-12K, HM35-12K, TM35-6K, UM40-12K, UM40-24K, UM46-12K, UM55-12K, UM63-12K, and UN68-12K (manufactured by Toho Tenax Co., Ltd.); Pyrofil (registered trademark) chopped fiber such as TR066, TR066A, TR068, TR06U, TR06NE, and TR06G (manufactured by Mitsubishi Rayon Co., Ltd.), and Toreka chopped fiber such as T008A-003 and T010-003 (manufactured by Toyo Rayon Co., Ltd.)

It is preferred that the carbon fiber be subjected to a surface treatment, in particular, an electrolytic treatment. Usable surface treatment agents include epoxy-type sizing agent, urethane-type agent, nylon-type sizing agent, olefin-type sizing agent, and the like. Performing a surface treatment is advantageous for increasing tensile strength and flexural strength. The surface-treated carbon fiber may be a commercial product. Specific examples include Besfite (registered trademark, manufactured by Toho Tenax Co., Ltd.) chopped fiber such as HTA-C6-SRS, HTA-C6-S, HTA-C6-SR, and HTA-C6-E (treated with an epoxy-type sizing agent), HTA-C6-N, HTA-C6-NR, and HTA-C6-NRS (treated with a nylon-type sizing agent), HTA-C6-US, HTA-C6-UEL1, HTA-C6-UH, and MC HTA-C6-US (treated with a urethane-type sizing agent); Pyrofil (registered trademark, manufactured by Mitsubishi Rayon Co., Ltd.) chopped fiber such as TR066, and TR066A (treated with an epoxy-type sizing agent), TR068 (treated with an epoxy-urethane-type sizing agent), TR06U (treated with a urethane-type sizing agent), TR06NE (treated with a polyamide-type sizing agent), and TR06G (treated with an aqueous sizing agent).

4. Graphite Powder

In the composition of the invention, the graphite powder is a component which improves acoustic properties by suppressing warping deformation of a molded article obtained from the composition of the invention.

As the graphite powder used in the composition of the invention, it is preferable to use ultra-thin graphite.

The ultra-thin graphite is graphite which is rendered thinner than common graphite by subjecting graphite to a special pulverizing process. Normally, the ultra-thin graphite has an average particle diameter of 10 μm or less and an apparent density of less than 0.1 g/cm$^3$.

The graphite powder used in the composition of the invention preferably has an average particle diameter (D2) of 5 μm≦D2≦15 μm. The smaller the particle diameter of the graphite powder, the higher the resonance frequency. However, if the particle diameter of the graphite powder is less than 5 μm, the effect of suppressing warping deformation of a molded article obtained from the composition containing the graphite powder with such a small particle diameter may not be exhibited sufficiently. On the other hand, an average particle diameter of the graphite powder exceeding 15 μm may result in a tendency for impact strength to lower readily. The average particle diameter of the graphite powder is measured by the laser diffraction and scattering method according to JIS R1629.

Further, the graphite powder preferably has an apparent density (ρ) of 0.02 g/cm$^3$≦ρ≦0.1 g/cm$^3$. If the apparent density of the graphite powder is less than 0.02 g/cm$^3$, the effect of suppressing warping deformation of a molded article obtained from the composition containing the graphite powder may not be exhibited sufficiently. On the other hand, an apparent density exceeding 0.1 g/cm$^3$ may result in a tendency for impact strength to lower readily. The apparent density of the graphite powder is measured by the still standing method according to JIS K5101.

As the graphite powder, a commercial product may be used. Specific examples include UP-10 (manufactured by Nippon Graphite Industries, Ltd.) and GR-15 (manufactured by Nippon Graphite Industries, Ltd.)

The total amount of the carbon fiber and the graphite powder blended with the composition of the invention is 10 to 30 wt %, preferably 10 to 20 wt %. If the total amount is less than 10 wt %, the effect of suppressing warping cannot be expected. An amount exceeding 30 wt % causes the composition or a molded article obtained from the composition to have an increased density (to have an increased weight). As a result, the advantageous effect of using the carbon fiber (to have a low density) is impaired.

The mass ratio (Wg/Wcf) of the graphite powder (Wg) to the carbon fiber (Wcf) is preferably 1 to 10.

The flexural strength and the flexural modulus of a molded article obtained from the composition of the invention as measured according to JIS K7171 are preferably 80 MPa or more and 3,800 MPa or more, respectively.

The amount of combustion residues derived from the carbon fiber and the graphite powder calculated by subjecting a molded article obtained from the composition of the invention to a combustion residue measurement test is preferably 3% or less.

Normally, the composition of the invention can be produced by the following method.

The composition of the invention can be produced by dry blending raw materials and melt kneading the resulting mixture using an extruder. Known extruders such as a uniaxial extruder and a biaxial extruder may be used. The carbon fiber may be fed together with other raw materials or may be fed separately from a side-feeder of an extruder. Methods described in JP-A-62-60625, JP-A-10-264152, WO97/19805, and the like can also be used.

In addition to the above components, various additives may be added to the composition of the invention insofar as the object of the invention is not impaired. As the additives which can be added, colorants, antioxidants, metal inactivators, carbon black, nucleus increasing agents, mold releasing agents, lubricants, antistatic agents, and the like can be mentioned.

The composition of the invention can be suitably used as a raw material of components of an air intake system of an internal combustion engine. As examples of the components of an air intake system can be mentioned an air duct constituting an air intake channel of an internal combustion engine, a resonator or a side branch which is provided in an air intake channel to reduce air intake noise, an air cleaner for removing dust in an air intake channel of an internal combustion engine, and the like.

The component of an air intake system of an internal combustion engine obtained using the composition of the invention has sufficient strength and dimensional stability, and are particularly excellent in inertance properties. Further, the component of an air intake system generates a very small amount of combustion residues since the carbon fiber and graphite powder are used as the filler, and therefore, is excellent in thermal recycling properties (excellent in recovery of thermal energy generated by combustion).

EXAMPLES

The following components were used in the compositions of the examples and the comparative examples.

1. Polypropylene-based Resin

Polypropylene (PP): J-2003GP (manufactured by Idemitsu Kosan Co., Ltd., MFR=20 g/10 min)

2. Acid-modified Polypropylene-based Resin

Maleic acid-modified polypropylene (MAH-PP): Polybond 3200 (manufactured by Shiraishi Calcium Kaisha, Ltd.)

3. Carbon Fiber

Carbon fiber: HTA-C6-SRS (manufactured by Toho Tenax Co., Ltd., fiber diameter of 7 μm, treated with an epoxy-type sizing agent)

4. Graphite Powder

UP-10 (manufactured by Nippon Graphite Industries, Ltd., artificial graphite powder, average particle diameter of 10 μm, apparent density of 0.04)

PAG5 (manufactured by Nippon Graphite Industries, Ltd., artificial graphite powder, average particle diameter of 35 μm, apparent density of 0.30)

PAG KS (manufactured by Nippon Graphite Industries, Ltd., soil-like graphite powder, average particle diameter of 9 μm, apparent density of 0.12)

GR-15 (manufactured by Nippon Graphite Industries, Ltd., thin graphite, average particle diameter of 15 μm, apparent density of 0.10)

5. Others (1) Glass fiber (GF): MAFT170A (manufactured by Asahi Glass Fiber Co., Ltd., fiber diameter of 13 μm)

(2) Mica: 80 mesh (manufactured by Fuji Talc Industries, Ltd., average particle diameter of 170 μm)

(3) Talc: JM209 (manufactured by Asada Milling Co., Ltd., average particle diameter of 4.5 μm)

The properties of the compositions obtained in the examples and the comparative examples were measured as follows:

1. Particle Diameter

Measured by the laser diffraction ,and scattering method according to JIS R1629.

2. Apparent Density

Measured by the still standing method according to JIS K5101.

3. Flexural Strength

A composition obtained in the examples or the comparative examples was subjected to injection molding to prepare a sample measuring 80 mm×10 mm×4 mm.

The flexural strength of the sample was measured according to JIS K7171.

4. Flexural Modulus

The sample obtained to measure the flexural strength was used to measure flexural modulus according to JIS K7171.

5. Resonance Frequency.

A test specimen measuring 124 mm (length)×12.7 mm (width)×3 mm (thickness) was prepared from a composition obtained in the examples or the comparative examples. The resonance frequency of the specimen was measured according to the central excitation method (according to JIS G0602).

6. Amount of Ash Content (Combustion Residues)

A pellet was produced by melt-kneading a composition obtained in the examples or the comparative examples. Using the resulting pellet, the ash content was measured according to the following procedures.

(1) The weight (W0) of a crucible was measured.

(2) The pellet to be measured for ash content was then placed in the crucible. The weight (W1) of the crucible with the pellet therein was measured.

(3) The crucible was placed in a muffle furnace, and ashed at 1,000° C.

(4) After the ashing, the crucible was removed from the apparatus, and the weight (W2) of the crucible was measured.

(5) The ash content was calculated by the following equation:

$$\text{Ash content [\%]}=(W2-W0)/(W1-W0)\times 100$$

In this equation, (W2−W0) is the weight after ashing and (W1−W0) is the weight before ashing.

The following equipment was used.

(1) Electronic balance: ER180A manufactured by Kensei Kogyo Co., Ltd.

(2) Muffle furnace: Muffle Furnace FP 310 manufactured by Yamato Scientific Co., Ltd.

Example 1

83 wt % of a polypropylene (PP) (J-2003GP), 2 wt % of a maleic acid-modified polypropylene (MAH-PP) (Polybond 3200), 5 wt % of carbon fiber (HTA-C6-SRS), and 10 wt % of graphite powder (UP-10) were mixed to produce a composition.

The composition obtained was measured for density, flexural strength, flexural modulus, resonance frequency, and ash content. The results obtained are shown in Table 1.

Example 2

A composition was produced and evaluated in the same manner as in Example 1, except that GR-15 was used instead of the graphite powder. The results obtained are shown in Table 1.

Comparative Examples 1 and 2

A composition was produced and evaluated in the same manner as in Example 1, except that PAG5 (Comparative Example 1) or PAG KS (Comparative Example 2) was used instead of the graphite powder. The results obtained are shown in Table 1.

Comparative Example 3

69 wt % of a polypropylene (J-2003GP), 1 wt % of a maleic acid-modified polypropylene (Polybond 3200), 11 wt % of glass fiber (GF), and 19 wt % of mica were mixed to produce a composition.

The composition was evaluated in the same manner as in Example 1. The results obtained are shown in Table 1.

Comparative Example 4

60 wt % of a polypropylene (J-2003GP) and 40 wt % of talc were mixed to produce a composition.

The composition was evaluated in the same manner as in Example 1. The results obtained are shown in Table 1.

The resonance frequency changes as the thickness of the product varies. The larger the thickness, the higher is the resonance frequency.

In Comparative Example 4, the resonance frequency was 300 Hz at a thickness of 3 mm. In Comparative Example 3, the resonance frequency was 315 Hz at a thickness of 3 mm. In Example 1, the resonance frequency was 325 Hz at a thickness of 3 mm, which was higher than the values in Compara-

TABLE 1

| | | Example 1 | Example 2 | Comparative Example 1 | Comparative Example 2 | Comparative Example 3 | Comparative Example 4 |
|---|---|---|---|---|---|---|---|
| Polypropylene-based resin | | PP | PP | PP | PP | PP | PP |
| Acid-modified polypropylene resin | | MAH-PP | MAH-PP | MAH-PP | MAH-PP | MAH-PP | — |
| Carbon fiber | | HTA-C6-SRS | HTA-C6-SRS | HTA-C6-SRS | HTA-C6-SRS | GF Mica | Talc |
| Graphite powder | Type | UP-10 | GR-15 | PAG5 | PAGKS | — | — |
| | Particle diameter ($\mu$m) | 10 | 15 | 35 | 9 | — | — |
| | Apparent density (g/cm$^3$) | 0.04 | 0.10 | 0.30 | 0.12 | — | — |
| Density [kg/m$^3$] | | 981 | 981 | 981 | 981 | 1120 | 1230 |
| Flexural strength [MPa] | | 94 | 93 | 90 | 88 | 86 | 48 |
| Flexural modulus [MPa] | | 5500 | 5130 | 4590 | 4940 | 5470 | 4850 |
| Resonance frequency [Hz] | | 325 | 312 | 293 | 308 | 315 | 300 |
| Ash content | | 3 | 3 | 3 | 3 | 30 | 40 |

Table 1 demonstrates that, as compared with the composition obtained in Example 1, the composition of Comparative Example 1 is insufficient in strength, elasticity, and resonance frequency due to the large particle size and apparent density (small aspect ratio) of the graphite powder. Therefore, the resultant product will not achieve the required performance.

The graphite powder contained in the composition of Comparative Example 2 has a larger particle diameter but a smaller apparent density than the graphite powder used in Example 1. As a result, the composition of Comparative Example 2 was insufficient in strength, elasticity, and resonance frequency, and therefore, as in the case of the composition of Comparative Example 1, the resultant product will not achieve the required performance. The above fact demonstrates that the product performance cannot be improved only by decreasing the particle diameter of the graphite powder.

The graphite powder contained in the composition of Example 2 has a large particle diameter but a smaller apparent density than the graphite powder contained in the composition of Comparative Example 2. Therefore, the composition obtained in Example 2 was sufficient in strength, elasticity, and resonance frequency, so that the resultant product will exhibit excellent properties. From the above fact, it can be seen that that the apparent density (aspect ratio) of the graphite powder is an important factor.

The FIGURE is a graph showing the relationship between the thickness and the resonance frequency. In the graph, ● indicates the composition of Example 1, ■ indicates the composition of Comparative Example 3, and ◆ indicates the composition of Comparative Example 4. From the FIGURE, it can be seen that a range satisfying the following expression is preferable:

resonance frequency $\geq$ (98.5 × thickness) + 15 tive Examples 3 and 4. Assuming that the target resonance frequency is 300 Hz, the composition of Example 1 is required to have a thickness of around 2.8 mm to attain the target resonance frequency of 300 Hz. Therefore, a thinner product can be obtained from the composition of Example 1, leading to a reduction in product weight.

INDUSTRIAL APPLICABILITY

The composition of the invention can be used in components of an air intake system of an internal combustion engine. In particular, the composition of the invention is suitably used in an air duct constituting an air intake channel of an internal combustion engine; a resonator or a side branch which is provided in an air intake channel of an internal combustion engine to reduce air intake noise; and an air cleaner for removing dust in an air intake channel of an internal combustion engine.

The invention claimed is:

1. A resin composition for a component of an air intake system of an internal combustion engine comprising
    (1) polypropylene-based resin: 67 to 89 wt %,
    (2) acid-modified polypropylene-based resin: 1 to 3 wt %, and
    (3) carbon fiber and graphite powder: 10 to 30 wt %;
    wherein the amount of the acid in the acid-modified polypropylene-based resin is 0.1 to 10 wt %, and the mass ratio (Wg/Wcf) of graphite powder (Wg) to carbon fiber (Wcf) in the resin composition is 1 to 10.

2. A resin composition of claim 1, wherein the resin composition has a flexural strength of 80 MPa or more and a flexural modulus of 3,800 MPa or more, as measured according to JIS K-7171, and wherein the amount of combustion residues derived from the carbon fiber and the graphite powder is 3% or less, as measured by a combustion residue measurement test.

3. A component of an air intake system of an internal combustion engine comprising the resin composition of claim 2, wherein the component has a thickness and a resonance frequency such that the relationship between the thickness and the resonance frequency of the formed component satisfies the expression:

resonance frequency(Hz)≧(98.5×thickness(mm))+15.

4. The component of claim 3, wherein the component is an air duct constituting an air intake channel of the internal combustion engine; a resonator or a side branch provided in the air intake channel of the internal combustion engine to reduce air intake noise; or an air cleaner for removing dust in the air intake channel of an internal combustion engine.

5. A component of an air intake system of an internal combustion engine comprising the resin composition of claim 1, wherein the component has a thickness and a resonance frequency such that the relationship between the thickness and the resonance frequency of the formed component satisfies the expression:

resonance frequency(Hz)≧(98.5×thickness(mm))+15.

6. The component of claim 5, wherein the component is an air duct constituting an air intake channel of the internal combustion engine; a resonator or a side branch provided in the air intake channel of the internal combustion engine to reduce air intake noise; or an air cleaner for removing dust in the air intake channel of an internal combustion engine.

7. A resin composition for a component of an air intake system of an internal combustion engine which comprises
   (i) polypropylene-based resin with a melt flow rate (at a temperature of 230° C. and under a load of 2.16 kg) of 5 to 70 g/10 mm: 67 to 89 wt %,
   (ii) acid-modified polypropylene-based resin: 1 to 3 wt %, and
   (iii) carbon fiber with a fiber diameter (D1) of 5 μm<D1<10 μm and graphite powder with an average particle diameter (D2) of 5 μm≦D2≦15 μm and an apparent density (ρ) of 0.02 g/cm³≦ρ≦0.1 g/cm³: 10 to 30 wt %;
   wherein the amount of the acid in the acid-modified polypropylene-based resin is 0.1 to 10 wt %, and the mass ratio (Wg/Wcf) of graphite powder (Wg) to carbon fiber (Wcf) in the resin composition is 1 to 10.

8. A resin composition of claim 7, wherein the resin composition has a flexural strength of 80 MPa or more and a flexural modulus of 3,800 MPa or more, as measured according to JIS K-7171, and wherein the amount of combustion residues derived from the carbon fiber and the graphite powder is 3% or less, as measured by a combustion residue measurement test.

* * * * *

UNITED STATES PATENT AND TRADEMARK OFFICE
CERTIFICATE OF CORRECTION

PATENT NO. : 7,571,702 B2 Page 1 of 1
APPLICATION NO. : 11/667163
DATED : August 11, 2009
INVENTOR(S) : Sugawara et al.

It is certified that error appears in the above-identified patent and that said Letters Patent is hereby corrected as shown below:

On the title page, Item (86), the PCT information is incorrect. Item (86) should read:

-- (86)  PCT No.:  PCT/JP2006/320093

§ 371 (c) (1),
(2), (4) Date: May 7, 2007 --

Signed and Sealed this

Twenty-ninth Day of September, 2009

David J. Kappos
*Director of the United States Patent and Trademark Office*